US00RE47932E

(19) United States
(12) Reissued Patent
Young et al.

(10) Patent Number: US RE47,932 E
(45) Date of Reissued Patent: Apr. 7, 2020

(54) SOUND SUPPRESSOR

(71) Applicant: SMITH & WESSON CORP., Springfield, MA (US)

(72) Inventors: N Blake Young, Boise, ID (US); Philip H Dater, Boise, ID (US)

(73) Assignee: Smith & Wesson Inc., Springfield, MA (US)

(21) Appl. No.: 15/656,512

(22) Filed: Jul. 21, 2017

Related U.S. Patent Documents

Reissue of:
(64) Patent No.: 9,086,248
Issued: Jul. 21, 2015
Appl. No.: 14/311,526
Filed: Jun. 23, 2014

U.S. Applications:
(60) Provisional application No. 61/838,382, filed on Jun. 24, 2013.

(51) Int. Cl.
*F41A 21/30* (2006.01)
*F01N 1/08* (2006.01)

(52) U.S. Cl.
CPC ..... *F41A 21/30* (2013.01); *F01N 1/083* (2013.01)

(58) Field of Classification Search
CPC . F41A 21/30; B25C 1/188; F01N 1/02; F01N 1/083; F01N 2490/08; F01N 2490/16
See application file for complete search history.

(56) References Cited

U.S. PATENT DOCUMENTS 1,184,431 A * 5/1916 Dodge ..... F01N 1/08 181/269
1,427,802 A * 9/1922 Goodwin ..... F41A 21/30 181/223
2,870,679 A 1/1959 Collins
2,900,875 A 8/1959 Fergus et al.
3,092,206 A * 6/1963 Moreau ..... F01N 1/083 181/270
3,811,531 A * 5/1974 Forssman ..... F01N 1/083 181/258
4,024,791 A 5/1977 Stratman
4,584,924 A 4/1986 Taguchi
4,664,014 A 5/1987 Hawley et al.
5,596,161 A 1/1997 Sommers
D415,812 S * 10/1999 Andrews, Jr. et al. ..... D22/100
6,837,139 B2 1/2005 Meyers
(Continued)

OTHER PUBLICATIONS

Office action dated Feb. 25, 2015 in related U.S. Appl. No. 14/311,526, 7 pages.

(Continued)

*Primary Examiner* — Peter C English
(74) *Attorney, Agent, or Firm* — Stinson LLP

(57) ABSTRACT

A monocore for a sound suppressor that significantly enhances the trapping and delay of the gases exiting from the sound suppressor due to the design, location, and configuration of slanted baffles and angled half-baffles, and a plurality of rods. The slanted baffles help define the blast chamber, expansion chambers, and exit chamber of the monocore. The plurality of rods may be positioned in the blast chamber or the expansions chambers. The plurality of rods may vary in length. The plurality of rods may also replace the angled half-baffles.

43 Claims, 4 Drawing Sheets

(56) References Cited

U.S. PATENT DOCUMENTS

| | | | | |
|---|---|---|---|---|
| 7,073,426 | B1 | 7/2006 | White | |
| 7,302,774 | B2 | 12/2007 | Meyers | |
| 7,308,967 | B1 | 12/2007 | Hoel | |
| 7,325,474 | B2 * | 2/2008 | Yoshimura et al. | 89/14.4 |
| 7,587,969 | B2 | 9/2009 | Silvers | |
| 7,677,150 | B2 | 3/2010 | Dater et al. | |
| 7,793,758 | B2 * | 9/2010 | Rimback | F01N 1/02 181/247 |
| 7,856,914 | B2 * | 12/2010 | Shults et al. | 89/14.4 |
| 7,861,636 | B1 | 1/2011 | Hoffman | |
| 7,874,238 | B2 | 1/2011 | Silvers | |
| 7,905,170 | B1 | 3/2011 | Brittingham et al. | |
| 7,931,118 | B1 * | 4/2011 | Cronhelm | 181/223 |
| 8,015,908 | B2 | 9/2011 | Kline et al. | |
| 8,096,222 | B2 | 1/2012 | Silvers | |
| 8,100,224 | B1 * | 1/2012 | Olson | 181/223 |
| 8,104,394 | B2 | 1/2012 | Meyers | |
| 8,104,570 | B2 | 1/2012 | Miller et al. | |
| 8,162,100 | B2 | 4/2012 | Shults et al. | |
| 8,167,084 | B1 * | 5/2012 | Moore | 181/223 |
| 8,171,840 | B2 | 5/2012 | Kline et al. | |
| 8,292,025 | B1 | 10/2012 | Woodell et al. | |
| 8,307,946 | B1 | 11/2012 | Johnston | |
| 8,490,535 | B1 * | 7/2013 | Moore et al. | F41A 21/30 181/223 |
| 8,528,691 | B1 * | 9/2013 | Carmichael et al. | 181/223 |
| 8,910,745 | B2 | 12/2014 | Latka | |
| 8,991,551 | B2 | 3/2015 | Latka | |
| 8,991,552 | B2 | 3/2015 | Latka | |
| 8,997,621 | B1 | 4/2015 | Dater et al. | |
| 9,046,316 | B1 | 6/2015 | Young | |
| 9,086,248 | B2 | 6/2015 | Young et al. | |
| 9,546,838 | B2 | 1/2017 | Liskey et al. | |
| 9,631,888 | B2 | 4/2017 | Young et al. | |
| 2010/0163336 | A1 * | 7/2010 | Presz et al. | 181/223 |
| 2011/0186377 | A1 * | 8/2011 | Kline et al. | 181/223 |
| 2013/0312592 | A1 * | 11/2013 | Storrs et al. | F41A 21/30 89/14.1 |
| 2014/0262604 | A1 * | 9/2014 | Proske | 181/223 |
| 2017/0167816 | A1 | 6/2017 | Young et al. | |

OTHER PUBLICATIONS

Liberty Essence Core, 2012 Hill Country Class 3, http://www.silencershop.com/wp-content/uploads/images/products/liberty_essence_5.jpg, accessed May 6, 2014, publication date unknown.

Liberty_kodiak TL Core, 2012 Hill Country Class 3, http://www.silencershop.com/wp-content/uploads/images/products/liberty_kodiak_tl_4.jpg, accessed May 6, 2014, publication date unknown.

* cited by examiner

SOUND SUPPRESSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims benefit of U.S. Provisional Application Ser. No. 61/838,382, filed on Jun. 24, 2013, which is incorporated herein in its entirety by reference.

TECHNICAL FIELD

This disclosure relates generally to sound suppressors. More particularly, it relates to sound suppressors for firearms featuring a monocore construction.

BACKGROUND

The field of firearm sound suppressors has seen many improvements resulting in higher sound reduction levels and a reduction in size. Firearm sound suppressors work by trapping and delaying the exit of the high pressure muzzle gases from a firearm when the firearm is discharged. Creation of turbulence is one technique used to enhance the trapping of the gases with a subsequent delay in the exit of the gases from a sound suppressor. If a sound suppressor is very effective at trapping and delaying the exit of the gases, this results in a lower sound level coming from the firearm.

When firearm sound suppressors are used, a phenomenon known as "First Round Pop" occurs when a shot is fired through the sound suppressor for the first time. The first shot is louder than second or subsequent shots due to the presence of oxygen in the sound suppressor. Once the oxygen is burnt up, the subsequent shots are quieter. What is needed is a sound suppressor that minimizes the sound of the first shot that is fired through the sound suppressor.

Firearm sound suppressors usually feature either use of discrete or individual components or a monolithic construction where the main structure is of one piece. The latter method of construction has become more popular over the last decade due to the use of Computer Numerically Controlled (CNC) machinery to produce a one-piece core, referred to herein as a "monocore," that has the baffle structure machined from one piece of metal. Until recently, the discrete technology suppressor has produced better sound reduction than the monocores. Current monocores are close to the discrete technology suppressor in efficiency and sound reduction levels but do not meet or exceed the efficiency levels of the discrete technology suppressor.

SUMMARY

A monocore for a firearm sound suppressor has a first side, a second side, a first portion, a second portion, a projectile passageway, an exit chamber, and at least one expansion chamber. The first side is configured for engagement with the firearm. The second side is spaced a longitudinal distance from the first side. The exit chamber is positioned near the second side. The first portion extends longitudinally between the first side and the second side. The second portion is spaced a width direction from the first portion and extends longitudinally between the first side and the second side. The projectile passageway extends longitudinally from the first side to the second side for a projectile from the firearm to travel through. The at least one expansion chamber is formed by two oppositely opposed slanted baffles and at least one of either the first portion or the second portion. An angled half baffle is positioned within the at least one expansion chamber. The angled half baffle extends from the at least one of either the first portion or the second portion toward the projectile passageway.

In an alternative embodiment, a monocore for a firearm sound suppressor has a first side, a second side, a first portion, a second portion, a projectile passageway, an exit chamber, a blast chamber, at least one expansion chamber, and a plurality of rods. The first side is configured for engagement with the firearm. The second side is spaced a longitudinal distance from the first side. The exit chamber is positioned near the second side. The blast chamber is positioned near the first side. The first portion extends longitudinally between the first side and the second side. The second portion is spaced a width direction from the first portion and extends longitudinally between the first side and the second side. The projectile passageway extends longitudinally from the first side to the second side for a projectile from the firearm to travel through. The at least one expansion chamber is formed by two oppositely opposed slanted baffles and at least one of either the first portion or the second portion. An angled half baffle is positioned within the at least one expansion chamber. The angled half baffle extends from the at least one of either the first portion or the second portion toward the projectile passageway. The plurality of rods are axially oriented and positioned around the projectile passageway.

In another alternative embodiment, a monocore for a firearm sound suppressor has a first side, a second side, a first portion, a second portion, a projectile passageway, an exit chamber, at least one expansion chamber, and a plurality of rods. The first side is configured for engagement with the firearm. The second side is spaced a longitudinal distance from the first side. The exit chamber is positioned near the second side. The first portion extends longitudinally between the first side and the second side. The second portion is spaced a width direction from the first portion and extends longitudinally between the first side and the second side. The projectile passageway extends longitudinally from the first side to the second side for a projectile from the firearm to travel through. The at least one expansion chamber is formed by two oppositely opposed slanted baffles and at least one of either the first portion or the second portion. The plurality of rods are positioned between the oppositely opposed slanted baffles and extend from at least of either the first portion or the second portion toward the projectile passageway.

BRIEF DESCRIPTION OF THE DRAWINGS

The description herein makes reference to the accompanying drawings, in which.

DETAILED DESCRIPTION

The disclosure herein relates to sound suppressors for firearms. The sound suppressors discussed herein have monocores with unique features that significantly enhance the trapping and delay of the gases exiting from the sound suppressor when a bullet is fired from the firearm to which the sound suppressor is attached.

Figure 1:
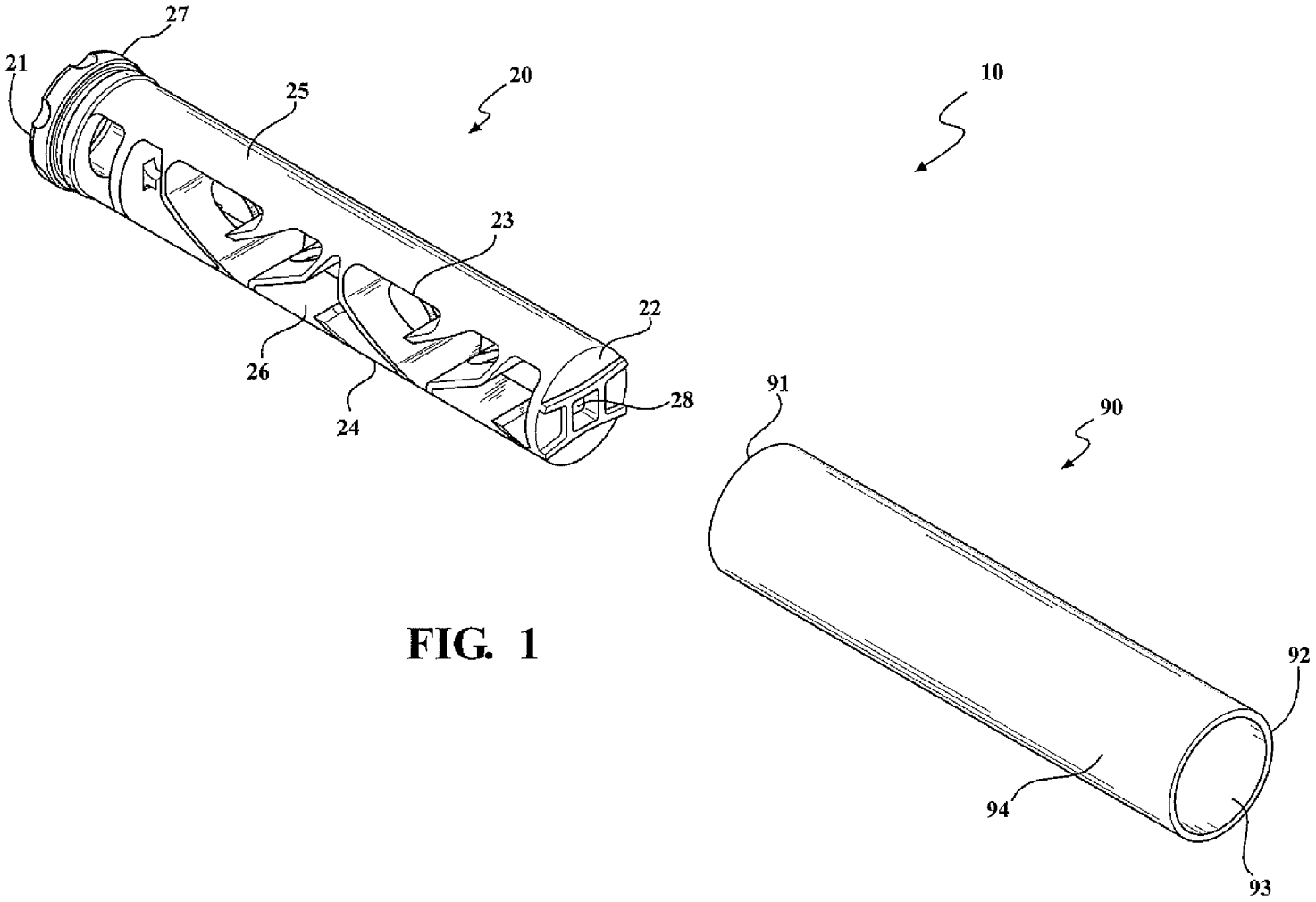
FIG. 1 is an exploded perspective view of a sound suppressor for a firearm.

FIG. 1 shows a sound suppressor 10 that includes a monocore 20 and a housing 90. The housing 90 is a hollow, tubular structure that extends longitudinally from a first end 91 to a second end 92. The housing 90 is made of a suitable material, such as metal or metal alloy. The first end 91 and the second end 92 are open, forming an inner surface 93 and an outer surface 94 that extend from the first end 91 to the second end 92. Near the first end 91, the inner surface 93 may be configured for attachment to the monocore 20. An example of such a configuration is threading. The housing 90 must be slightly larger than the monocore 20, such that when the monocore 20 is inserted into the housing 90, the inner surface 93 of the housing 90 is in continuous contact with the monocore 20.

The monocore 20 is a one-piece tubular structure made of a suitable material, such as metal or metal alloy, having a first side 21 (*rear end*), a second side 22 (*forward end*), a first portion 23, a second portion 24, an outer surface 25, and an inner surface 26. *A projectile passageway P extending between the first side 21* (*rear end*) *and the second side 22* (*forward end*) *permits a projectile to pass through the monocore 20 along a projectile axis* (*indicated by an arrow having a head near the second side 22*). The first side 21 is a spaced a longitudinal distance from the second side 22. The first portion 23 is spaced a width direction from the second portion 24. The outer surface 25 is spaced a width direction from the inner surface 26. The first portion 23 and the second portion 24 extend longitudinally between the first side 21 and the second side 22. The first portion 23 and the second portion 24 are formed by the outer surface 25, the inner surface 26, a blast chamber 30, at least one expansion chamber 40, and an exit chamber 50. Near the first side 21, the outer surface 25 may be configured for engagement with the inner surface 93 of the housing 90. This is shown as threading 27.

As shown, the first side 21 is an end cap, and the second side 22 is an integrally formed disc-like structure. It is anticipated that the first side 21 could be an integrally formed disc-like structure and that the second side 22 could be an end cap. The first side 21 and the second side 22 are closed except for an aperture 28. The size of the aperture 28 will depend on the caliber of the firearm. The larger the caliber is, the larger the aperture 28 will need to be so that a bullet (not shown) may travel through it.

Figure 2:
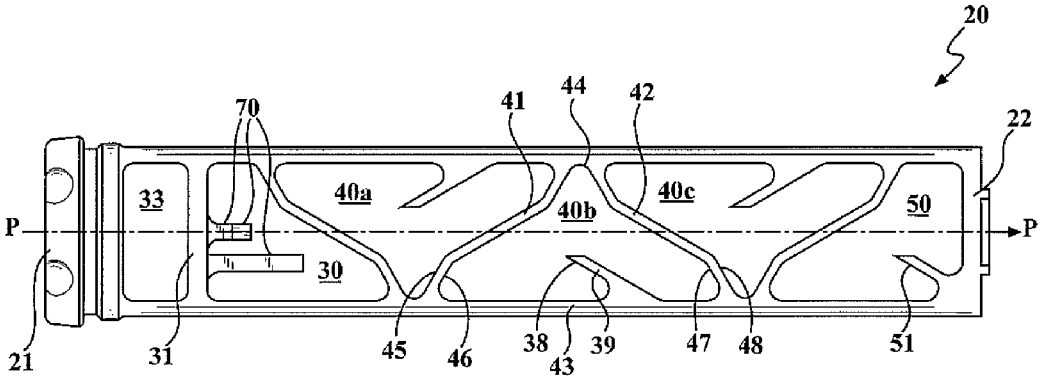
FIG. 2 is a side view of a first embodiment of a monocore.
Figure 3:
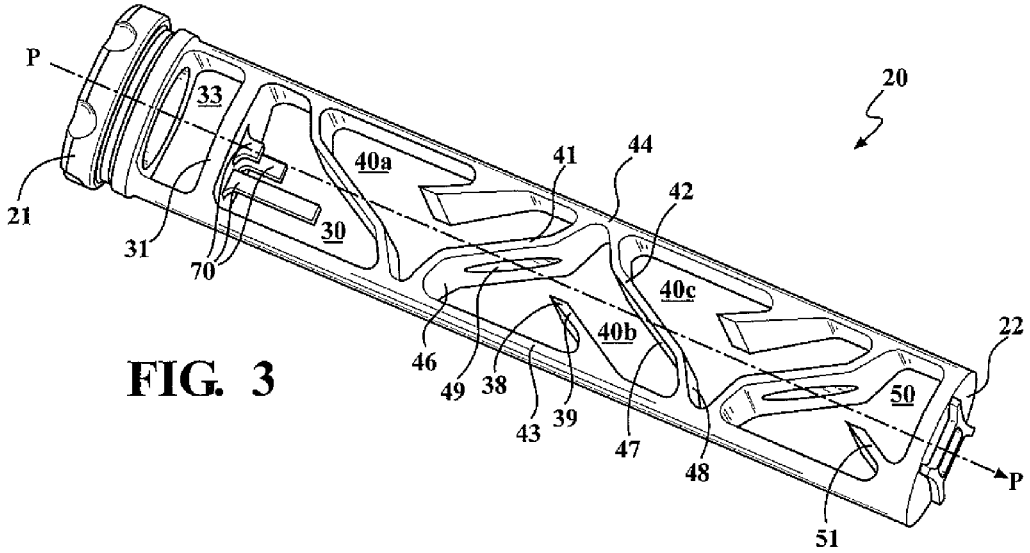
FIG. 3 is a side perspective view of the monocore of FIG. 2.

Shown in FIGS. 2-3, a bore that extends longitudinally through the center of the monocore 20 from the first side 21 to the second side 22 defines a projectile passageway P. The projectile passageway P may be circular and allows for the bullet to travel through the monocore 20 from the first side 21 to the second side 22 of the monocore 20. The size of the projectile passageway P must be large enough and free of obstructions, so that the bullet may travel without impediment through the monocore 20. The size of the projectile passageway P will vary depending on the caliber of the firearm the sound suppressor 10 is attached to. The larger the caliber of the firearm is, the larger the projectile passageway P will need to be.

Each expansion chamber 40 is a generally triangular void formed in the monocore 20. Each expansion chamber 40 is defined by a first slanted baffle 41, a second slanted baffle 42, and a base 43. The first slanted baffle 41 and the second slanted baffle 42 are solid partitions with a circular aperture 49 that, while angled, create a barrier with the inner surface 93 of the housing 90 when the monocore 20 is inserted into the housing 90 so that fluid or air can only flow through the circular aperture 49 to move through the monocore 20. The first slanted baffle 41 and the second slanted baffle 42 are oppositely opposed and extend from the first portion 23 to the second portion 24 of the monocore 20. The first slanted baffle 41 is closer to the first side 21 of the monocore 20 than the second slanted baffle 42, and the second slanted baffle 42 is closer to the second side 22 of the monocore 20 than the first slanted baffle 41. The first slanted baffle 41 and the second slanted baffle 42 are furthest away from one another near the base 43 and closest to one another near a tip 44. The base 43 of the expansion chamber 40 is adjacent to either the first portion 23 or the second portion 24 of the monocore 20. When more than one expansion chamber 40 is present, each adjacent expansion chamber 40 is rotated 180 degrees so that the base 43 of each expansion chamber 40 alternates from being adjacent to the first portion 23 of the monocore 20 to being adjacent to the second portion 24 of the monocore 20.

The first slanted baffle 41 has a first surface 45 that faces the first side 21 of the monocore and a second surface 46 that faces the second side 22 of the monocore 20. The second slanted baffle 42 has a first surface 47 that faces the first side 21 of the monocore 20 and a second surface 48 that faces the second side 22 of the monocore 20.

In each expansion chamber 40, an angled half baffle 39 (*broadly, "partial baffle"*) may be positioned between the first slanted baffle 41 and the second slanted baffle 42. The angled half baffle 39 is a solid, slanted partition that extends from the inner surface 26 of the monocore 20 toward the projectile passageway. The angled half baffle 39 may be integrally formed with the monocore 20. The angled half baffle 39 may be located adjacent to either the first portion 23 or the second portion 24 of the monocore 20. The angled half baffle 39 creates a barrier with the inner surface 93 of the housing 90 when the monocore 20 is inserted into the housing 90 such that fluid cannot pass through it, because the area between the projectile passageway P and the respective one of the first portion 23 or the second portion 24 from which the angled half baffle 39 extends is blocked by the angled half baffle 39. Instead, fluid traveling through the expansion chamber 40 is forced to travel adjacent to one of the first portion 23 or the second portion 24 that is located opposite the angled half baffle 39. *In the embodiment illustrated in FIGS. 2 and 3, the angled half baffle 39 in expansion chamber 40b extends parallel to the baffle 42, and the angled half baffle 39 slants rearwardly. The expansion chamber 40b includes a recess between the angled half baffle 39 and the second portion 24. The free end 38 of the angled half baffle 39 is spaced from the second portion 24 across the recess in a direction perpendicular to the pro-*

*jectile passageway P. The angled partial baffle extends generally toward the first side 21 (rear end) such that the free end 38 points directly at the slanted baffle 41 and directly at the aperture 49 in the slanted baffle 41. The angled half baffles in the expansion chambers 40a and 40c have configurations similar to the angled half baffle 39 in the expansion chamber 40b but extend from the portion 23 rather than from the portion 24. With respect to the expansion chamber 40b, the slanted baffle 41 is located toward the first side 21 from the angled partial baffle 39 in the expansion chamber 40b, the slanted baffle 41 slants away from the portion 24 and toward the second side 22, and the angled partial baffle 39 extends from the portion 24 toward the first side 21. Furthermore, the slanted baffle 42 is located toward the second side 22 from the angled partial baffle 39, and the slanted baffle 42 slants away from the portion 24 and toward the first side 21. With respect to the expansion chamber 40c, the slanted baffle toward the second end 22 partially defining the expansion chamber 40c is connected to the portion 23 and extends from the portion 23 toward the first side 21.*

A free end 38 of the angled half baffle 39 is positioned near the projectile passageway P. No portion of the angled half baffle 39 may extend into the projectile passageway P. If any portion of the angled half baffle 39 extends into the projectile passageway P, an aperture must be formed near the free end 38 so that the bullet may pass through the projectile passageway P without being impeded. The length that the angled half baffle 39 extends away from the inner surface 26 of the monocore 20 will vary depending on the caliber of the firearm, because the size of the projectile passageway P is dependent on the caliber of the firearm. The larger the projectile passageway P must be, the less distance that the angled half baffle 39 can extend away from the inner surface 26 of the monocore 20 toward the projectile passageway P.

Although any number of expansion chambers 40 may be used, three expansion chambers 40a, 40b, 40c are shown. The first expansion chamber 40a is positioned closest to the first side 21 (*rear end*) of the monocore 20, and the third expansion chamber 40c is positioned closest to the second side 22 (*forward end*) of the monocore 20. The second expansion chamber 40b is positioned between the first expansion chamber 40a and the third expansion chamber 40c. Because multiple expansion chambers 40a, 40b, 40c are present, the second expansion chamber 40b is rotated 180 degrees from the first expansion chamber 40a and the third expansion chamber 40c. This results in second slanted baffle 42 of the [first] *second* expansion chamber [40a] *40b* being [located adjacent to] the first slanted baffle [41] of the [second] *third* expansion chamber [40b] *40c*, and the [second] *first* slanted baffle [42] *41* of the second expansion chamber 40b being [located adjacent to] the [first] *second* slanted baffle [41] of the [third] *first* expansion chamber [40c] *40a*.

A blast plate 31 is a circular disc formed near the first side 21 of the monocore 20. The blast plate 31 may be integrally formed with the monocore 20. Because the projectile passageway P also extends through the blast plate 31, the blast plate 31 has a circular aperture [32] that is large enough for the bullet to pass through. A hollow space 33 is formed between the first side 21 and the blast plate 31. The blast chamber 30 is a generally triangular void formed by the blast plate 31 and the first slanted baffle [41] of the expansion chamber 40 that is closest to the first side 21. *The blast chamber 30 is formed between the first side 21 and the first expansion chamber 40a.*

The exit chamber 50 is a generally triangular void formed by the second side 22 and the second slanted baffle [42] of the expansion chamber 40 that is closest to the second side 22. An angled half baffle 51 (*broadly, "partial baffle"*) may be integrally formed in the exit chamber 50 and extend toward the projectile passageway P. The angled half baffle 51 is a solid, slanted partition that extends from the inner surface 26 of the monocore 20 toward the projectile passageway. The angled half baffle [39] *51* may be integrally formed with the monocore 20. The angled half baffle 51 may be located adjacent to either the first portion 23 or the second portion 24 of the monocore 20. The angled half baffle 51 may slant toward the first side 21 or the second side 22 of the monocore. As shown, the angled half baffle 51 slants toward the first side 21. *The angled half baffle 51 extends away from the second side 22 toward the projectile passageway P and toward the expansion chambers 40a, 40b, 40c.* The angled half baffle [39] *51* creates a barrier with the inner surface 93 of the housing 90 when the monocore 20 is inserted into the housing 90 such that fluid or air cannot pass through it. If any portion of the angled half baffle 51 extends into the projectile passageway P, an aperture must be formed in the angled half baffle 51 so that the bullet may pass through without being impeded.

The blast plate 31 may be provided with a plurality of rods 70 that are axially oriented and positioned around the projectile passageway P. Each rod of the plurality of rods 70 may vary in length to minimize harmonic resistance. The plurality of rods 70 may be integrally formed with the monocore 20. As shown, the cross-sectional shape of the rods 70 is rectangular, and the rods 70 extend toward the second side 22 of the monocore 20. It is anticipated that the rods could have another shape, such as circular. While the plurality of rods 70 are shown as being positioned symmetrically around the projectile passageway P on the blast plate 31, the positioning may be asymmetrical.

The arrangement and positioning of the plurality of rods 70 is caliber dependent and may vary from caliber to caliber. Because the pressure of muzzle gases varies from caliber to caliber and barrel length, the length and positioning of the rods 70 is dependent upon the pressure of the muzzle gases and upon the position of any slanted baffles 41, 42 in the monocore 20.

The plurality of rods 70 have been found to increase turbulence in the blast chamber 30, the expansion chambers 40, and the exit chamber 50. The plurality of rods 70 have also been found to assist in the maximum delaying of the gases from the sound suppressor 10. The increased surface area of the plurality of rods 70 helps provide initial gas cooling, which results in an unexpected benefit to the overall performance of the sound suppressor 10. The plurality of rods 70 in the blast chamber 30 helps reduce the "First Round Pop" effect.

Figure 4:
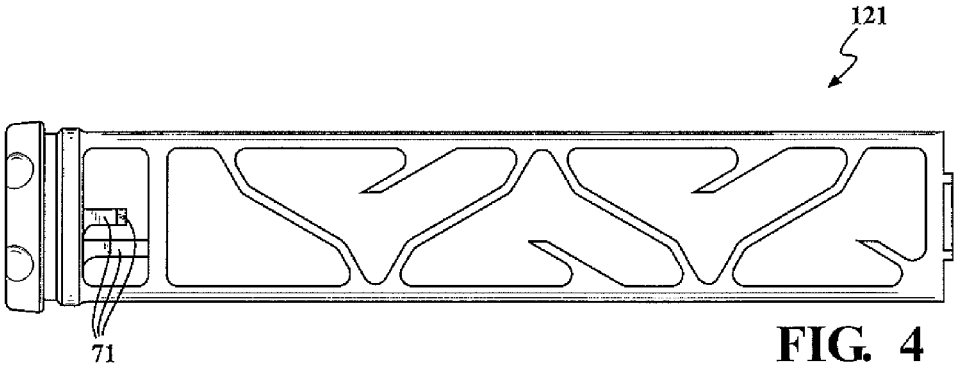
FIG. 4 is a side view of the monocore in a second embodiment.
Figure 5:
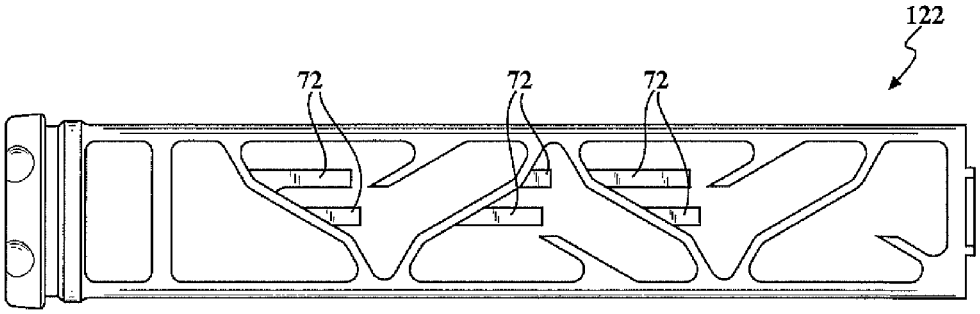
FIG. 5 is a side view of the monocore in a third embodiment.
Figure 6:
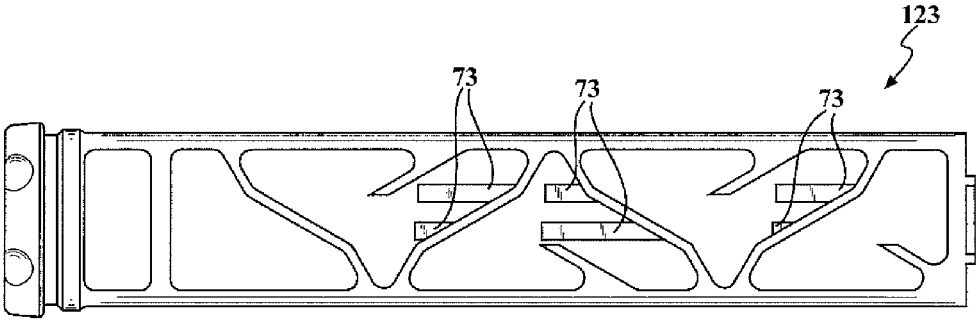
FIG. 6 is a side view of the monocore in a fourth embodiment.
Figure 7:
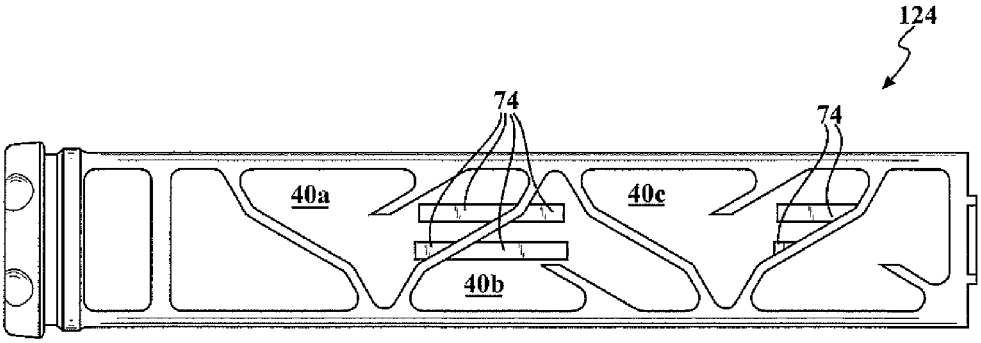
FIG. 7 is a side view of the monocore in a fifth embodiment.
Figure 8:
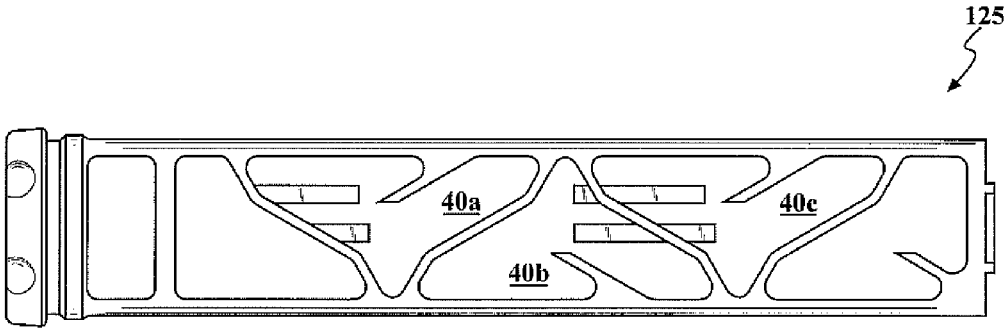
FIG. 8 is a side view of the monocore in a sixth embodiment.

In alternative embodiments, the plurality of rods 70 may be provided elsewhere in the monocore 20. In FIG. 4, a plurality of rods 71 are provided in the first side 21 of a monocore 121. The slanted baffles 41, 42 may also be provided with the plurality of rods 70, as shown in FIGS. 5-8. Generally, the plurality of rods 70 on the slanted baffles 41, 42 are positioned so that only one surface 45-48 within each expansion chamber 40 is provided with rods. In FIG. 5, a plurality of rods 72 are shown on the surfaces 45-48 that face toward the second side 22 of a monocore 122. In FIG. 6, a plurality of rods 73 are shown on the surfaces 45-48 that face toward the first side 21 of a monocore 123. In FIGS. 7-8, a plurality of rods [74, 75 alternate surfaces 45-48 between each adjoining expansion chamber 40] *are provided on different baffles* in monocores 124, 125. For example, in FIG. 7, [the] rods 74 are positioned on [the first surfaces 47 of the second slanted baffles 42 in] *a slanted baffle separating* the first expansion chamber 40a *and the second expansion chamber 40b,* and *rods are provided on a baffle bounding* the third expansion chamber 40c[, and the rods 74 are positioned on the second surface 46 of the first slanted baffle 41 in the second expansion chamber 40b]. In FIG. 8, [the] rods [75] are positioned on [the second surfaces 46 of the first] *a* slanted [baffles 41 in] *baffle bounding* the first expansion chamber 40a, and [the] rods [75] are positioned on [the first surface 46 of the second] *a* slanted baffle [42 in] *separating* the second expansion chamber 40b *and the third expansion chamber 40c*.

Figure 9:
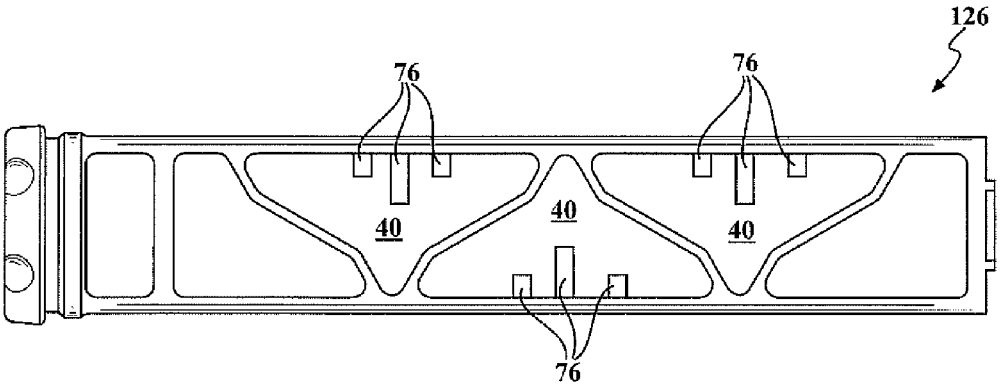
FIG. 9 is a side view of the monocore in a seventh embodiment.

In another, alternative embodiment, a plurality of rods 76 may replace the angled half baffles 39 in the expansion chamber 40, as shown in FIG. 9. The plurality of rods 76 may be integrally formed with a monocore 126. The plurality of rods 76 are located between the first slanted baffles 41 and the second slanted baffles 42. The plurality of rods 76 extend away from the inner surface 26 of the monocore 126 toward the projectile passageway P. The length of the plurality of rods 76 can vary; however, no rod 76 can be longer than the distance between the inner surface 26 of the monocore 126 and the projectile passageway P. Otherwise, the rods 76 would interfere with the bullet's ability to traverse the projectile passageway P. The plurality of rods 76 may be located adjacent to either the first portion 23 or the second portion 24 of the monocore 126. *In the embodiment illustrated in FIG. 9, the rods 76 extend transverse to the projectile passageway. Some of the rods 76 extend from respective ends fixed to an upper longitudinal portion (first portion 23) of the monocore 126, and other rods 76 extend from respective ends fixed to a lower longitudinal portion (second portion 24) of the monocore.*

To assemble the sound suppressor 10, the monocore 20 is inserted into the housing 90 and secured. The monocore 20 could be secured by twisting the threading 27 on the outer surface 25 of the monocore 20 into the threading on the inner surface 93 of the housing 90 near the first end 91. Alternatively, the monocore 20 could be secured to the housing 90 through the use of an end cap. Once the monocore 20 is securely held inside the housing 90, the sound suppressor 10 may be attached to a firearm. This could be accomplished through the use of a quick connect coupling, such as a bayonet Other assembly arrangements are possible and would be obvious to those skilled in the art.

While the invention has been shown and described with reference to a certain specific preferred embodiment, modification may now suggest itself to those skilled in the art. Such modifications and various changes in form and detail may be made herein without departing from the spirit and scope of the invention. Accordingly, it is understood that the invention will be limited only by the appended claims.

What is claimed is:

1. A [monocore for a] firearm sound suppressor, comprising: a first side configured for engagement with the firearm; a second side spaced a longitudinal distance from the first side [and having an exit chamber]; a first portion that extends longitudinally between the first side and the second side; a second portion that is spaced a width direction from the first portion and extends longitudinally between the first side and the second side; a projectile passageway that extends longitudinally from the first side to the second side for a projectile from the firearm to travel through; and at least one expansion chamber formed by two oppositely opposed slanted baffles and at least one of either the first portion or the second portion, wherein an angled [half] *partial* baffle is positioned within the at least one expansion chamber and extends from the at least one of either the first portion or the second portion toward the projectile passageway.

2. The [monocore] *suppressor* of claim 1, wherein the at least one angled [half-baffle] *partial baffle* is parallel to one of the oppositely opposed slanted baffles.

3. The [monocore] *suppressor* of claim 1, further comprising: an exit chamber, the exit chamber formed between the at least one expansion chamber and the second side.

4. The [monocore] *suppressor* of claim 3, wherein the exit chamber has an angled [half-baffle] *partial baffle* extending away from the second side toward the at least one expansion chamber.

5. The [monocore] *suppressor* of claim 1, further comprising: a plurality of rods, the plurality of rods axially oriented and positioned around the projectile passageway.

6. The [monocore] *suppressor* of claim 5, *wherein the suppressor comprises a monocore including the first portion, the second portion, the two oppositely opposed slanted baffles, and the angled partial baffle, and* wherein the plurality of rods are integrally formed with the monocore.

7. The [monocore] *suppressor* of claim 5, further comprising: a blast chamber formed between the first side and the at least one expansion chamber, wherein the plurality of rods are formed within the blast chamber.

8. The [monocore] *suppressor* of claim 5, wherein each rod from the plurality of rods has a different length than the other rods from the plurality of rods.

9. The [monocore] *suppressor* of claim 5, wherein the plurality of rods are formed on at least one of the oppositely opposed slanted baffles.

10. The [monocore] *suppressor* of claim 5, wherein the plurality of rods are formed on the first side of the [monocore] *suppressor*.

11. A [monocore for a] firearm sound suppressor, comprising: a first side configured for engagement with the firearm and having a blast chamber; a second side spaced a longitudinal distance from the first side and having an exit chamber; a first portion that extends longitudinally between the first side and the second side; a second portion that is spaced a width direction from the first portion and extends longitudinally between the first side and the second side; a projectile passageway extending from the first side to the second side for a projectile from the firearm to travel through; at least one expansion chamber formed by two oppositely opposed slanted baffles and at least one of either the first portion or the second portion, wherein an angled [half] *partial* baffle is positioned within the at least one expansion chamber and extends from the at least one of either the first portion or the second portion toward the projectile passageway; and a plurality of rods axially oriented and positioned around the projectile passageway.

12. The [monocore] *suppressor* of claim 11, *wherein the suppressor comprises a monocore including the first portion, the second portion, the two oppositely opposed slanted baffles, and the angled partial baffle, and* wherein the plurality of rods are integrally formed with the monocore.

13. The [monocore] *suppressor* of claim 11, wherein each rod from the plurality of rods has a different length than the other rods from the plurality of rods.

14. The [monocore] *suppressor* of claim 11, wherein the plurality of rods are formed within the blast chamber.

15. The [monocore] *suppressor* of claim 11, wherein the plurality of rods are formed on at least one of *the* oppositely opposed slanted baffles.

16. The [monocore] *suppressor* of claim 11, wherein the plurality of rods are formed on the first side of the [monocore] *suppressor*.

17. A [monocore for a] firearm sound suppressor, comprising: a first side configured for engagement with the firearm; a second side spaced a longitudinal distance from the first side and having an exit chamber; a first portion that extends longitudinally between the first side and the second side; a second portion that is spaced a width direction from the first portion and extends longitudinally between the first side and the second side; a projectile passageway that extends longitudinally from the first side to the second side for a projectile from the firearm to travel through; and at least one expansion chamber defined by two oppositely opposed slanted baffles and at least one of either the first portion or the second portion, wherein a plurality of rods are positioned within the at least one expansion chamber between the oppositely opposed slanted baffles and each extend transverse to the projectile passageway from a fixed end that is connected to at least [of] one of the first portion or the second portion toward the projectile passageway to a free end.

18. The [monocore] *suppressor* of claim 17, *wherein the suppressor comprises a monocore including the first portion, the second portion, and the two oppositely opposed slanted baffles, and* wherein the plurality of rods are integrally formed with the monocore.

19. The [monocore] *suppressor* of claim 17, further comprising: a blast chamber formed between the first side and the at least one expansion chamber.

20. A [monocore for a] firearm sound suppressor, comprising: a first side configured for engagement with the firearm; a second side spaced a longitudinal distance from the first side and having an exit chamber; a first portion that extends longitudinally between the first side and the second side; a second portion that is spaced a width direction from the first portion and extends longitudinally between the first side and the second side; a projectile passageway that extends longitudinally from the first side to the second side for a projectile from the firearm to travel through; at least one expansion chamber defined by two oppositely opposed slanted baffles and at least one of either the first portion or the second portion, wherein a plurality of rods are positioned between the oppositely opposed slanted baffles and extend from at least [of] one of the first portion or the second portion toward the projectile passageway; and an angled half baffle that extends from the second side toward the projectile passageway.

*21. The suppressor of claim 1, wherein the expansion chamber includes a recess between the angled partial baffle and said at least one of the first portion or the second portion, the angled partial baffle having a free end spaced from said at least one of the first portion or the second portion across the recess in a direction perpendicular to the projectile passageway.*

*22. The suppressor of claim 21, wherein the angled partial baffle extends generally toward the first side such that the free end of the angled partial baffle points directly at a first slanted baffle of the two oppositely opposed slanted baffles.*

*23. The suppressor of claim 22, wherein said first slanted baffle includes an opening defining part of the projectile passageway, the angled partial baffle extending generally toward the first side such that the free end points directly at the opening.*

*24. The suppressor of claim 23, wherein the first slanted baffle is located toward the first side from the angled partial baffle, the first slanted baffle slanting away from the first portion and toward the second side, the angled partial baffle extending from the first portion toward the first side.*

*25. The suppressor of claim 24, wherein a second slanted baffle of said two oppositely opposed slanted baffles is located toward the second side from the angled partial baffle, the second slanted baffle slanting away from the first portion and toward the first side.*

*26. The suppressor of claim 25, wherein the expansion chamber is a first expansion chamber and the angled partial baffle is a first angled partial baffle, the suppressor further comprising a third slanted baffle located toward the second side from the second slanted baffle, the third slanted baffle slanting away from the first portion and toward the second side, the second and third slanted baffles bounding a second expansion chamber, the suppressor further comprising a second angled partial baffle positioned in the second expansion chamber, the second angled partial baffle being connected to the second portion and extending from the second portion toward the first side.*

*27. A firearm sound suppressor for use with a firearm, the suppressor comprising:*

*a structure having a rear end, a forward end, and a length extending therebetween;*

*a projectile passage extending between the rear and forward ends of the structure through which a projectile can pass along a projectile axis from the rear end to the forward end when the structure is supported by the firearm and the projectile is fired from the firearm;*

*an expansion chamber bounded by a first slanted baffle at a rear end of the expansion chamber and bounded by a second slanted baffle at a forward end of the expansion chamber, the expansion chamber being further formed by a longitudinal portion of the structure extending between the first and second slanted baffles; and*

*a partial baffle in the expansion chamber, the partial baffle extending inboard from the longitudinal portion of the structure and slanting rearwardly.*

*28. The suppressor of claim 27, wherein the structure is formed as a single piece of material.*

*29. The suppressor of claim 27, further comprising a housing in which the structure is receivable, the housing bounding the expansion chamber when the structure is received in the housing.*

*30. The suppressor of claim 27, wherein the expansion chamber includes a recess between the partial baffle and said longitudinal portion, the partial baffle having a free end spaced from said longitudinal portion across the recess in a direction perpendicular to the projectile passage.*

*31. The suppressor of claim 30, wherein the partial baffle slants rearwardly such that the free end of the partial baffle points directly at the first slanted baffle.*

*32. The suppressor of claim 31, wherein the first slanted baffle includes an opening defining part of the projectile passage, the partial baffle slanting rearwardly such that the free end of the partial baffle points directly at the opening.*

*33. The suppressor of claim 30, wherein the first slanted baffle slants away from the longitudinal portion and toward the forward end.*

*34. The suppressor of claim 33, wherein the second slanted baffle slants away from the longitudinal portion and toward the rear end.*

*35. The suppressor of claim 34, wherein the longitudinal portion is a first longitudinal portion and the structure further comprises a second longitudinal portion across the projectile passage from the first longitudinal portion, wherein the expansion chamber is a first expansion chamber*

*and the partial baffle is a first partial baffle, the suppressor further comprising a third slanted baffle located forward from the second slanted baffle and bounding a second expansion chamber, the third slanted baffle slanting away from the first longitudinal portion and toward the forward end, the suppressor further comprising a second partial baffle in the second expansion chamber, the second partial baffle extending inboard from the second longitudinal portion and slanting rearwardly.*

*36. The suppressor of claim 35, wherein the second slanted baffle bounds the second expansion chamber.*

*37. The suppressor of claim 36, wherein the first slanted baffle extends from the first longitudinal portion to the second longitudinal portion, the second slanted baffle extends from the first longitudinal portion to the second longitudinal portion, and the third slanted baffle extends from the first longitudinal portion to the second longitudinal portion.*

*38. The suppressor of claim 35, further comprising a fourth slanted baffle located forward from the third slanted baffle and bounding a third expansion chamber, the fourth slanted baffle slanting away from the first longitudinal portion and toward the rear end, the suppressor further comprising a third partial baffle in the third expansion chamber, the third partial baffle extending inboard from the first longitudinal portion and slanting rearwardly.*

*39. The suppressor of claim 38, wherein the second slanted baffle bounds the second expansion chamber, and the third slanted baffle bounds the third expansion chamber.*

*40. The suppressor of claim 27, wherein the longitudinal portion is a first longitudinal portion and the structure further comprises a second longitudinal portion across the projectile passage from the first longitudinal portion, wherein the expansion chamber is a first expansion chamber and the partial baffle is a first partial baffle, the suppressor further comprising a third slanted baffle located forward from the second slanted baffle and bounding a second expansion chamber, the suppressor further comprising a second partial baffle in the second expansion chamber, the second partial baffle extending toward the projectile passage.*

*41. The suppressor of claim 40, further comprising a fourth slanted baffle located forward from the third slanted baffle and bounding a third expansion chamber, the suppressor further comprising a third partial baffle in the third expansion chamber, the third partial baffle extending toward the projectile passage.*

*42. The suppressor of claim 41, wherein the second slanted baffle bounds the second expansion chamber, and the third slanted baffle bounds the third expansion chamber.*

*43. The suppressor of claim 41, wherein the first slanted baffle extends from the first longitudinal portion to the second longitudinal portion, the second slanted baffle extends from the first longitudinal portion to the second longitudinal portion, and the third slanted baffle extends from the first longitudinal portion to the second longitudinal portion, and wherein the second and third partial baffles slant rearwardly.*

* * * * *